Jan. 25, 1966     O. ÖHRNELL     3,231,072
APPARATUSES FOR TAKING OFF SUSPENSION LOOPS
FROM SCREW CONVEYORS
Filed July 8, 1963

INVENTOR
*Olof Öhrnell*

BY *Wenderoth, Lind & Ponack*

ATTORNEYS

United States Patent Office 3,231,072
Patented Jan. 25, 1966

3,231,072
APPARATUSES FOR TAKING OFF SUSPENSION
LOOPS FROM SCREW CONVEYORS
Olof Öhrnell, Torgilsgatan 17B, Boras, Sweden
Filed July 8, 1963, Ser. No. 293,300
Claims priority, application Sweden, July 9, 1962,
7,656/62
3 Claims. (Cl. 198—213)

The present invention relates to an apparatus for taking off, from a screw conveyor, suspension loops and like members which are advanced thereby. Earlier, such apparatuses for taking off suspension loops were both complicated and expensive as they always comprised a special lifting device. The present invention eliminates these disadvantages. The invention is thus essentially characterized by the fact that the apparatus is constituted by a delivery bar or like means which is arranged on that side of the screw conveyor towards which the suspension loop tends to move by reason of its frictional engagement with the rotary screw of the conveyor, the distance of said delivery bar from the screw increasing in the direction of motion of the suspension loop and the delivery bar being so arranged in relation to the path of travel of the suspension loop as to force the latter to pass from the screw to the delivery bar. Thus the screw proper produces the necessary lifting work, thereby dispensing with a particular lifting device.

Further features of the invention and the advantages gained thereby will become apparent from the following detailed description, reference being made to the accompanying drawing schematically illustrating an apparatus, chosen by way of example. In the drawing.

Figure 1:
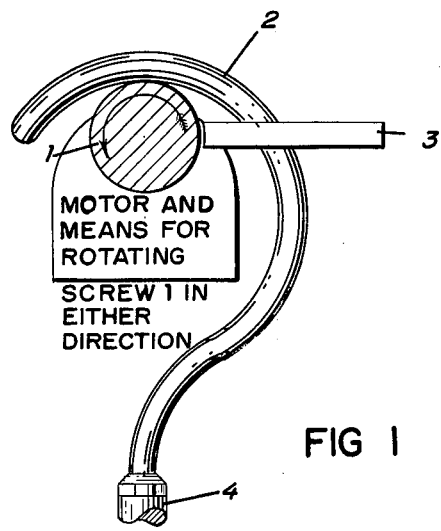
FIG. 1 is a cross-sectional view of the conveyor screw, in which a suspension loop is engaged with the taking-off apparatus, which is associated with said conveyor screw.

The rotary screw of the conveyor is designated 1 and the suspension loop 2 or 2' is adapted to engage the thread of said screw to be moved along by it.

The apparatus for taking off suspension loops according to the invention is constituted by a delivery bar 3 or 3' or like means which is arranged on that side of the screw conveyor towards which the suspension loop 2 tends to move due to its frictional engagement with the rotary screw 1 of the conveyor. According to the drawing the screw 1 rotates clockwise and the delivery bar 3 thus has to be on the right side of the screw 1.

The distance of the delivery bar 3 from the screw 1 increases in the direction of motion of the suspension loop 2, and the delivery bar 3 is so arranged in relation to the path of travel of the suspension loop 2 as to force the latter to pass from the screw 1 onto said delivery bar. This naturally requires that the load supporting stem 4 of the suspension loop 2 is on the same side of the screw 1 as is the delivery bar 3.

The part of the delivery bar 3 which serves as an apparatus for taking off the suspension loops is in the same plane as the screw 1. The delivery bar 3 may, however, be provided with a downwardly inclined extension so that the suspension loop 2 will move to the desired position by gravity.

In the cases where the screw 1 of the conveyor is adapted alternately to rotate in one and the other direction it is equipped with delivery bars 3' on the other side. With this arrangement the distance of the delivery bars 3' from the screw 1 shall increase in opposite directions. It is obvious that upon rotation of the screw in one direction, the stem 4 shall be on one side of the screw 1 while it shall be on the other side of the screw 1 when the screw rotates in the other direction.

Figure 2:
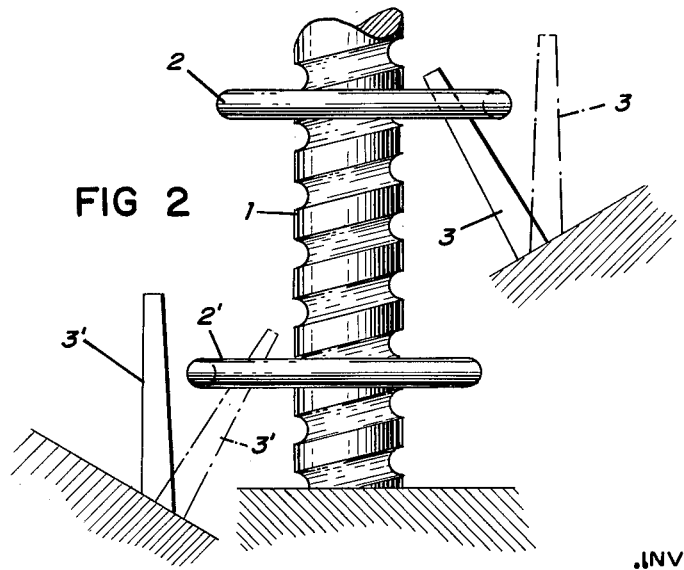
FIG. 2 is a plan view of the same parts as in FIG. 1.

The apparatus for taking off suspension loops according to the invention may be utilized to advantage with such screw conveyors as are employed in the continuous manufacture of industrial articles which are treated and/or assembled stepwise in a number of stations. Thus there shall be a delivery bar 3 at each station and as will appear from the dash and dot portion in FIG. 2 the bar 3 shall normally be outside the path of travel of the suspension loops 2. The bars 3 are then adapted to be swung, in dependence on the position set for an abutment or like means on the suspension loops 2, to the position shown by full lines in FIG. 2, in which they serve as taking-off apparatuses.

In certain cases the delivery bars 3 are adapted permanently to be in the path of travel of the suspension loops 2.

The above embodiment of the invention was described for purposes of illustration rather than limitation. All possible variations and modifications of the invention are understood as being included within the scope of tthe appended claims.

What I claim and desire to secure by Letters Patent is:

1. A conveying transfer apparatus comprising a rotary conveyor having a screw thread, a suspension loop having hook means engaging the thread of said conveyor, a delivery bar located on that side of said conveyor towards which said suspension loop moves by the frictional engagement of said hook means with the thread of said conveyor, said delivery bar being spaced increasingly in the direction of motion of said suspension loop from said conveyor and upon contacting said hook means raising and removing said suspension loop from said conveyor by the frictional action of said thread against said hook means to transfer said suspension loop from said conveyor to said delivery bar.

2. An apparatus as claimed in claim 1, wherein said conveyor is rotated in either direction and a delivery bar is provided on each side of said conveyor.

3. An apparatus as claimed in claim 1 wherein said delivery bar is pivotally mounted outside the path of travel of said suspension loop so that said bar may be swung to the position in which it serves as transfer for the suspension loop.

References Cited by the Examiner
UNITED STATES PATENTS

| | | | |
|---|---|---|---|
| 1,775,545 | 9/1930 | Anderson | 198—38 |
| 2,774,458 | 12/1956 | Keuper | 198—38 |
| 2,908,379 | 10/1959 | Hamilton | 198—213 |
| 2,946,427 | 7/1960 | Friedman | 198—38 |
| 2,987,170 | 6/1961 | Hamilton | 198—213 |
| 3,051,096 | 8/1962 | Walsh | 198—213 |

SAMUEL F. COLEMAN, Primary Examiner.

WILLIAM B. LABORDE, Examiner.